DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 707

T888,012
PHOTOGRAPHIC FILMS HAVING CARBON-CONTAINING BACKING LAYERS

Herbert S. Elins, 1669 Lake Ave., Rochester, N.Y. 14615

Filed Nov. 25, 1970, Ser. No. 92,618
Int. Cl. G03c *1/78*
U.S. Cl. 96—87
No Drawing. 24 Pages Specification

Certain photographic films, such as color films of the type disclosed by Mannes et al. U.S. Pat. 2,252,718, have an antihalation or antistatic backing layer composed of carbon black dispersed in a cellulosic binder. A problem may occur with this type of film, especially under conditions of high humidity, when the carbon-containing layer is in contact with the top emulsion layer as happens when the film is tightly wound upon itself. This problem is apparently associated with oxidation of materials in the top emulsion layer and, in the case of color film of the type indicated, manifests itself in the phenomenon known as "yellow mottle ferrotyping." The problem is avoided or reduced in accordance with the present invention by placing an antioxidant, such as a hydroquinone, a catechol, an aminophenol, a 3-pyrazolidone, an ascorbic acid derivative, a reductone or a phenylenediamine in the carbon-containing backing layer or in an overcoat layer for the top emulsion layer or for the backing layer. Antioxidants, such as ascorbyl palmitate, 3-hydroxy-5-(4-pyridyl)-tetronimide, piperidinohexose reductone, and 2-(2-octadecyl)-5-(2-sulfo-tertiary butyl) hydroquinone, employed in this manner, not only prevent yellow mottle ferrotyping when the color film comes in contact with the carbon-containing backing layer, but prevent loss of latent image in the film caused by air oxidation under humid conditions.